(12) United States Patent
Cho et al.

(10) Patent No.: US 7,490,357 B2
(45) Date of Patent: Feb. 10, 2009

(54) DATA PROTECTION IN DATA STORAGE SYSTEM

(75) Inventors: Sung-Youn Cho, Seoul (KR);
Seung-Youl Jeong, Hwaseong-Si (KR);
Jong-Lak Park, Suwon-Si (KR);
Hak-Yeol Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 905 days.

(21) Appl. No.: 10/909,686

(22) Filed: Aug. 2, 2004

(65) Prior Publication Data
US 2005/0047594 A1     Mar. 3, 2005

(30) Foreign Application Priority Data
Aug. 29, 2003 (KR) .................. 10-2003-0060206

(51) Int. Cl.
*G06F 21/00* (2006.01)
(52) U.S. Cl. .......................... 726/29; 713/193
(58) Field of Classification Search .................. 726/29
See application file for complete search history.

(56) References Cited

U.S. PATENT DOCUMENTS

| | | | | | |
|---|---|---|---|---|---|
| 5,016,121 | A | * | 5/1991 | Peddle et al. | 360/39 |
| 5,377,343 | A | * | 12/1994 | Yaezawa | 711/164 |
| 5,535,355 | A | * | 7/1996 | Scales | 711/101 |
| 5,668,945 | A | * | 9/1997 | Ohba et al. | 726/30 |
| 5,799,145 | A | * | 8/1998 | Imai et al. | 726/19 |
| 6,012,145 | A | * | 1/2000 | Mathers et al. | 726/17 |

* cited by examiner

*Primary Examiner*—Matthew B Smithers
(74) *Attorney, Agent, or Firm*—Monica H. Choi

(57) ABSTRACT

For protecting data within a data storage system, such as a hard disk drive, security enable mode is entered. In that mode, initialization data is moved from a first area of a disk to a second area of the disk with a location of the second area being randomly generated. The initialization data is then erased from the first area. Also, a first cipher for firmware and a second cipher for a disk are both changed into a randomly generated value. Later, access to the initialization data from the second area is granted in the security enable mode if the first and second ciphers are the same.

28 Claims, 7 Drawing Sheets

DATA PROTECTION IN DATA STORAGE SYSTEM

BACKGROUND OF THE INVENTION

This application claims priority to Korean Patent Application No. 2003-0060206, filed on Aug. 29, 2003, in the Korean Intellectual Property Office, the disclosure of which is incorporated herein in its entirety by reference.

1. Field of the Invention

The present invention relates generally to data storage systems such as hard disk drives, and more particularly, to data protection such that data stored within the data storage system is not available to an unauthorized user.

2. Description of the Related Art

An example data storage system is a HDD (hard disk drive). Initial supply of power to a hard disk drive starts an initialization process. During the initialization process, a spindle motor and a head are moved over a predetermined area of a disk for reading maintenance cylinder (MC) data thereon. Such MC data is then stored within a buffer.

The predetermined area of the disk where the MC data is stored is normally not accessible by a user but may be accessible through the inside of a hard disk drive. Information needed for initializing the hard disk drive is stored in such a predetermined area. Such initialization information includes a serial number, a defect list, smart information, zone information, and the like for the hard disk drive. The MC data stored in the buffer contains information needed to operate the hard disk drive for performing read/write operations. Thus, such MC data is critical for typical operations of the hard disk drive.

The MC data, as critical initialization data, is loaded in the buffer during the initialization process whenever power is initially supplied to the hard disk drive. Thereafter, the MC data is erased from the buffer when power is no longer supplied to the hard disk drive.

In general, a hard disk drive includes a device that locks firmware within the hard disk drive for protection of data stored in the hard disk drive. However, when a printed circuit board (PCB) to which the firmware is loaded is switched with another PCB that does not lock the firmware, data in the hard disk drive is accessible to unauthorized users just as in a hard disk drive where the firmware is not locked.

SUMMARY OF THE INVENTION

Accordingly, in a general aspect of the present invention, data within a data storage system is protected from access by an unauthorized user, especially when loading of firmware is changed.

According to an embodiment of the present invention, for protecting data within a data storage system, a controller determines whether a security enable command is input to a controller from a host. Initialization data is moved from a first area of a disk to a second area of the disk when the security enable command is input. A location of the second area of the disk is randomly generated. The initialization data is erased from the first area of the disk when the security enable command is input. Information of the location of the second area of the disk is stored in a memory.

In a further embodiment of the present invention, when the security enable command is input, a first cipher for firmware and a second cipher stored in a predetermined area of the disk are both changed into a randomly generated value. In addition in that case, a security flag is set to represent a security enable mode.

In another embodiment of the present invention, during initialization of the data storage system, the controller determines whether the security flag is set to represent the security enable mode. The initialization data is read from the first area of the disk when the security flag is not set to represent the security enable mode. On the other hand when the security flag is set to represent the security enable mode, the first cipher for the firmware is compared with the second cipher stored in the predetermined area of the disk. The initialization data is read from the second area of the disk if the first cipher is substantially same as the second cipher. The location of the second area of the disk is read from the memory.

Alternatively when the security flag is set to represent the security enable mode, a user password is received to be compared to the first cipher for firmware and to the second cipher stored in the predetermined area of the disk. The initialization data is read from the second area of the disk when the user password, the first cipher, and the second cipher are substantially same.

In a further embodiment of the present invention, when a security disable command is input during the security enable mode, the initialization data is moved from the second area back to the first area. In addition, the initialization data is erased from the second area, and the security flag is set to represent a normal mode.

The present invention may be practiced to particular advantage when the data storage system is a hard disk drive. In that case, the initialization data comprises maintenance cylinder data.

In this manner, critical data for the data storage system, such as MC data for the hard disk drive, is inaccessible to a user when the firmware is loaded to a different hard disk drive. When the security flag is set to represent the security enable mode, the MC data is stored in a random location of the disk such that such critical data is difficult to access by an unauthorized user. In addition, the first cipher corresponding to the firmware must match the second cipher stored within the disk for access to such critical data. Thus, if undesired firmware is loaded to the hard disk drive, or if the firmware is loaded to a different hard disk drive, the first cipher for the firmware does not match the second cipher stored within the disk such that critical data is not accessible.

BRIEF DESCRIPTION OF THE DRAWINGS

The above and other aspects and advantages of the present invention will become more apparent by describing in detail preferred embodiments thereof with reference to the attached drawings in which.

The figures referred to herein are drawn for clarity of illustration and are not necessarily drawn to scale. Elements having the same reference number in FIGS. 1, 2, 3, 4, 5, 6, and 7 refer to elements having similar structure and/or function.

DETAILED DESCRIPTION OF THE INVENTION

Hereinafter, embodiments of the present invention are described in detail with reference to the accompanying drawings. The present invention is described herein for a HDD (hard disk drive). However, the present invention may be practiced for protecting data in any other types of data storage systems.

Figure 1:
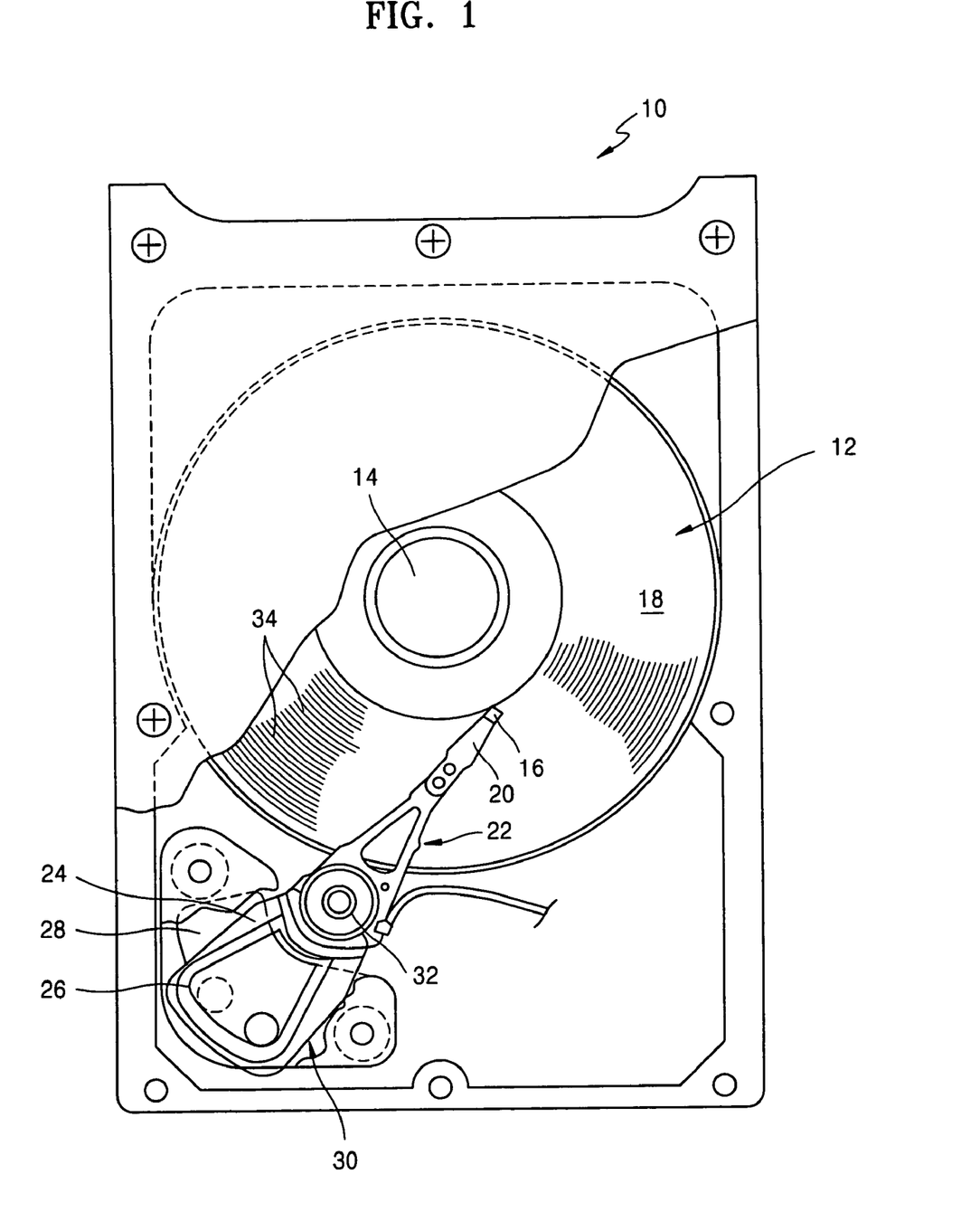
FIG. 1 is a plan view of a disk drive according to an embodiment of the present invention.

FIG. 1 is a plan view of a disk drive 10 according to an embodiment of the present invention. Referring to FIG. 1, the disk drive 10 includes at least one magnetic disk 12 which is rotated by a spindle motor 14. The disk drive 10 also includes a transducer 16 disposed over a disk surface 18.

The transducer 16 writes/reads information by magnetizing/sensing the magnetic field of the disk surface 18 as the transducer 16 flies over the disk surface 18. For simplicity and clarity of illustration, FIG. 1 illustrates the disk drive 10 having a single transducer 16. However, a transducer unit typically includes two types of transducers: a recording transducer that magnetizes the magnetic field over the disk surface 18 for writing data thereon; and a reading transducer that senses the magnetic field over the disk surface 18 for reading data thereon. The reading transducer is typically manufactured as a magneto-resistive (MR) element.

In the example embodiment of FIG. 1, the transducer 16 is formed onto a slider 20. The slider 20 is adapted to form an air bearing between the transducer 16 and the disk surface 18. The slider 20 is coupled to a head gimbal assembly 22 attached to an actuator arm 24 that includes a voice coil 26. The voice coil 26 is disposed adjacent a magnetic assembly 28 that includes a voice coil motor (VCM) 30. Application of current to the voice coil 26 causes generation of a torque which rotates the actuator arm 24 with respect to a bearing assembly 32. The rotation of the actuator arm 24 results in movement of the transducer 16 across the disk surface 18.

In general, data is stored in circular tracks 34 of the disk 12. Each of the tracks 34 includes a plurality of sectors, and each of the sectors includes a data field and an identification field. The identification field includes a gray code for distinguishing between a sector and a track (i.e., a cylinder). The transducer 16 moves over and across the disk surface 18 to read data from or write data to a track.

Figure 2:
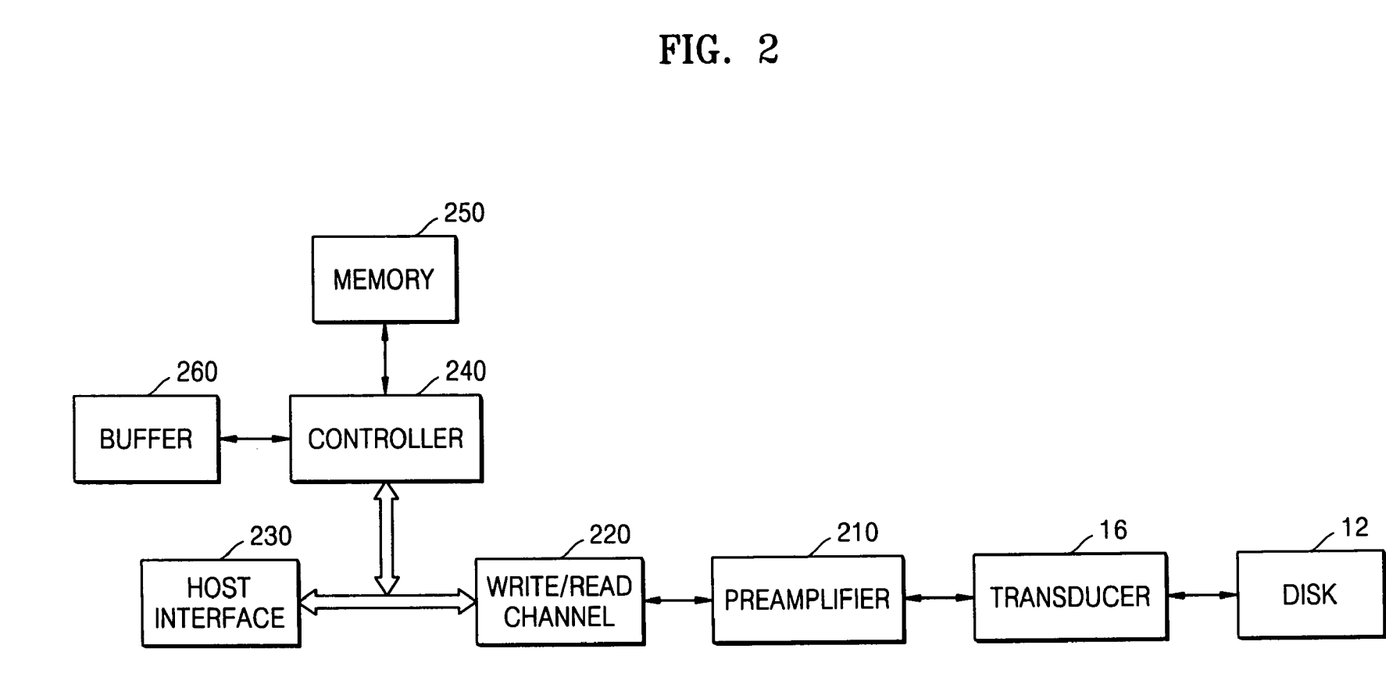
FIG. 2 is a block diagram of components of a disk drive for protecting data, according to an embodiment of the present invention.

FIG. 1 shows mechanical components of a disk drive according to an embodiment of the present invention. FIG. 2 shows a block diagram also including electrical components of a disk drive according to an embodiment of the present invention. The disk drive of FIG. 2 includes the disk 12, the transducer 16, a preamplifier 210, a write/read channel 220, a host interface 230, a controller 240, a memory 250, and a buffer 260. In this disclosure, a circuit that includes the preamplifier 210 and the write/read channel 220 will be referred to as a write/read circuit.

The memory 250 stores programs and data for controlling operation of the disk drive of FIGS. 1 and 2. In particular, such programs within the memory 250 include sequences of instructions that when executed by the controller 240, which is a data processor, causes the controller 240 to perform steps of the processes illustrated by the flowcharts of FIGS. 3, 4, 5, and 6. Such steps of the flowcharts of FIGS. 3, 4, 5, and 6 are for protection of data within the hard disk drive, according to an embodiment of the present invention. In an example embodiment of the present invention, the memory 250 is a non-volatile memory.

The buffer 260 stores initialization data for operating the hard disk drive after such initialization data is read from the disk 12 under control of the controller 240. The initialization data includes maintenance cylinder (MC) data for the disk 12. In particular, the controller 240 controls operation of the hard disk drive by performing the steps of the processes of FIGS. 3, 4, 5, and 6 for protection of data stored in the disk 12.

General operations of the hard disk drive are first described. In read mode, the preamplifier 210 amplifies an electrical signal, which is sensed from the disk 12 by the transducer 16 (comprised of a magnetic head or an MR head). Next, the write/read channel 220 encodes the amplified electrical signal, i.e., an analog signal, into a digital format so that a host apparatus (not shown) reads the electrical signal in digital format. Thereafter, the write/read channel 220 transforms the converted digital signal into stream data and transmits the stream data to the host apparatus via the host interface 230.

Alternatively, in write mode, the hard disk drive receives user data from the host apparatus via the host interface 230. The write/read channel 220 converts the user data into a binary data stream appropriate for the write channel. In addition, the preamplifier 210 amplifies a write current used for recording the user data on the disk 12 via the transducer 16 (magnetic head).

A method of protecting data in the hard disk drive, such as that of FIGS. 1 and 2, according to an embodiment of the present invention is now described with reference to FIGS. 3 through 6.

Figure 3:
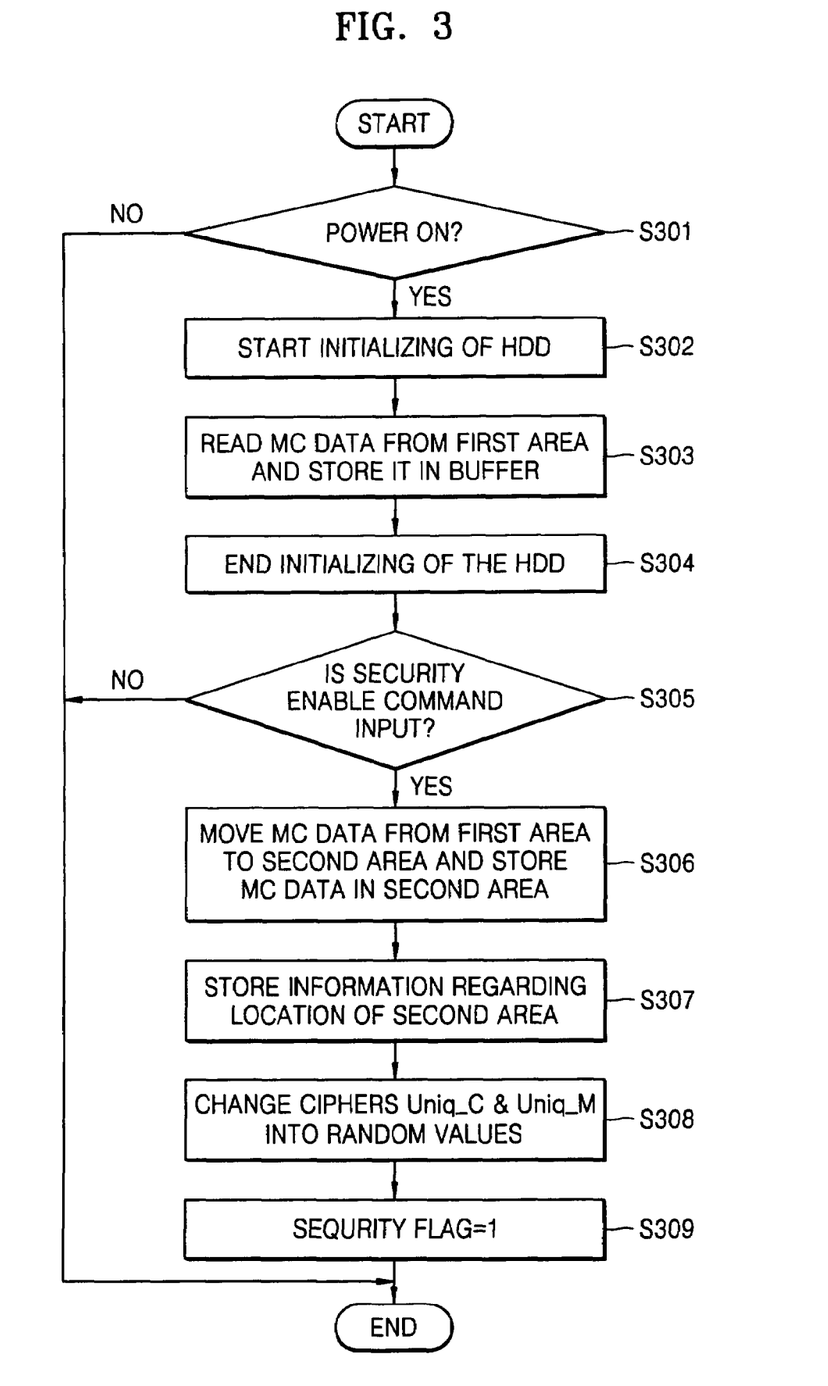
FIG. 3 is a flowchart of steps performed by a controller of the disk drive of FIG. 2 during a process of changing from a normal mode to a security enable mode for protecting data, according to an embodiment of the present invention.

First, a method of changing from a normal mode to a security enable mode in the hard disk drive is described with reference to FIG. 3. Referring to FIGS. 2 and 3, the controller 240 determines whether the hard disk drive is powered on (s301 of FIG. 3). If the hard disk drive is powered on, the controller 240 starts an initialization process of the hard disk drive in the normal mode (s302 of FIG. 3). During such an initialization process, the spindle motor 14 is rotated at a predetermined speed, and the transducer 16 is moved to an initially set first area of the disk 12, in which MC data is stored. The MC data contains information for operating the hard disk drive, such as a serial number, a defect list, smart information, and zone information for the hard disk drive.

Next, the MC data is read from the first area using the transducer 16, and the MC data is stored in the buffer 260 (s303 of FIG. 3). Thereafter, the initialization process of the hard disk drive ends, and the hard disk drive is placed in a standby mode until a next command is given (s304 of FIG. 3).

Subsequently, the controller 240 determines whether a security enable command is input to the controller 240 from a host computer (not shown) via the host interface 230 (s305 of FIG. 3). If the security enable command is input to the controller 240, the MC data stored in the first area is moved to and stored in a second area of the disk 12 (s306 of FIG. 3).

Figure 7:
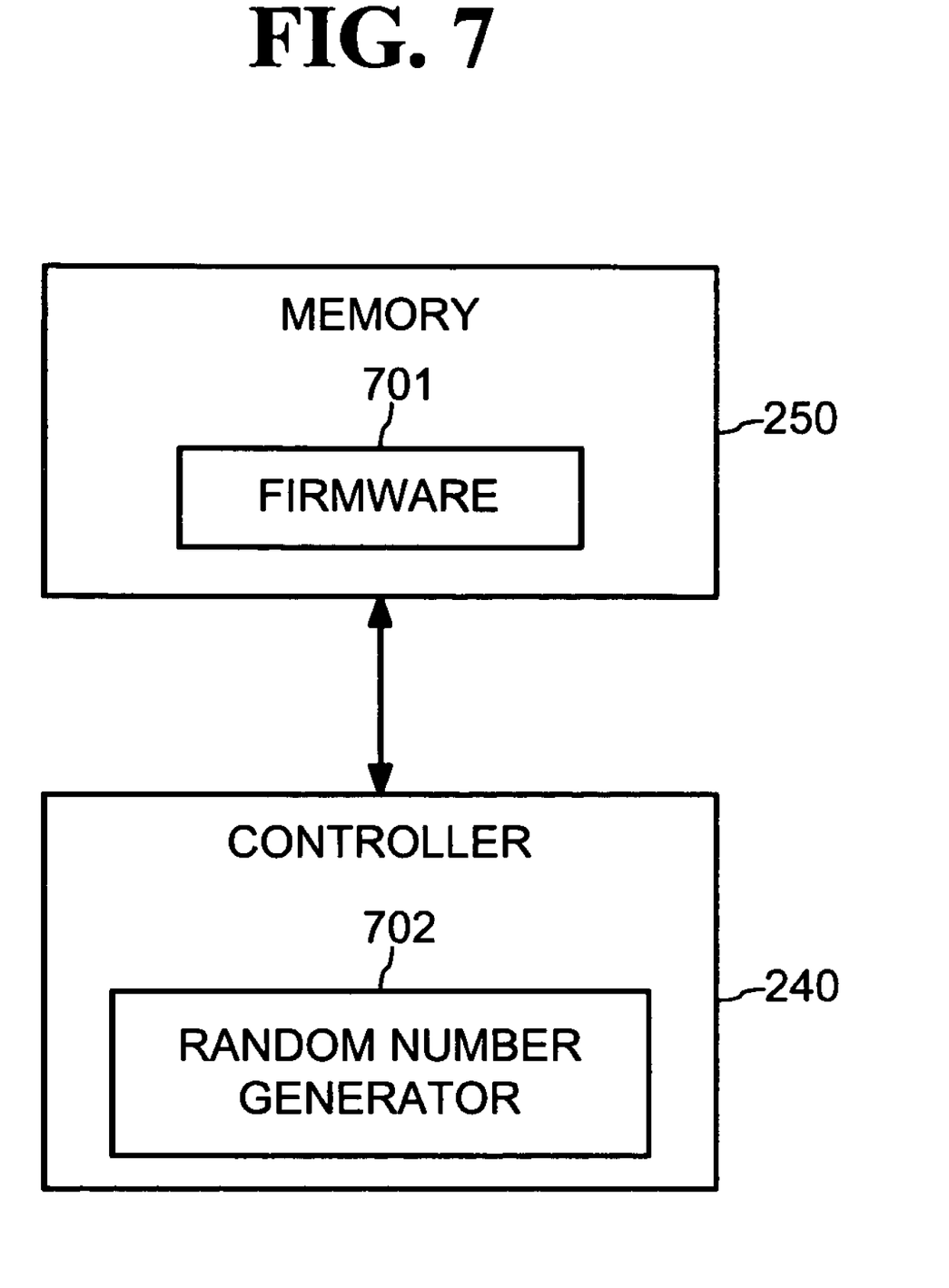
FIG. 7 shows components within a memory and the controller of the disk drive of FIG. 2, according to an embodiment of the present invention.

Referring to FIG. 7, the controller 240 includes a random number generator 702 for randomly generating the location of the second area on the disk 12. Furthermore, after the MC data has been stored in the second area of the disk 12, the MC data is deleted from the first area of the disk 12. In addition, the controller 240 stores information regarding the randomly generated location of the second area in the memory 250 (s307 of FIG. 3).

Additionally referring to FIGS. 2, 3, and 7, the controller 240 changes a first cipher, Uniq_C, included in a firmware 701 installed in the memory 250 and a second cipher, Uniq_M, stored in the disk 12 into a randomly generated value (s308 of FIG. 3). The random number generator 702 is used to generate such as random value for the first cipher, Uniq_C, and the second cipher, Uniq_M. Subsequently, the controller 240 sets a security flag to "1" for representing the security enable mode (s309 of FIG. 3).

In this manner, the controller 240 moves the MC data stored in the initially set first area of the disk 12 to the second area with the randomly generated location in the security enable mode. Also, the controller 240 changes the first cipher, Uniq_C, in the firmware and the second cipher, Uniq_M, stored in the disk 12 into a randomly generated value before setting the security flag to "1".

Figure 4:
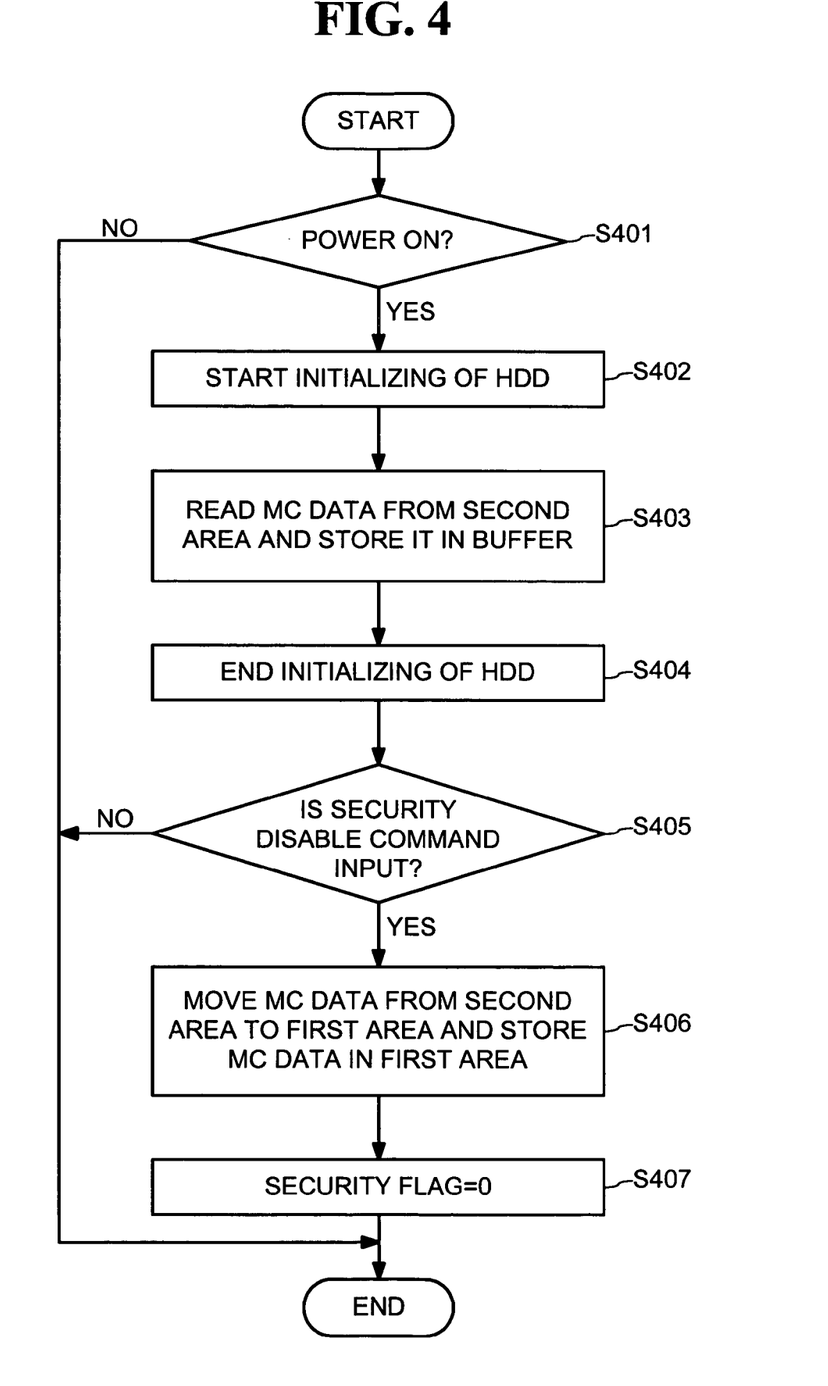
FIG. 4 is a flowchart of steps performed by the controller of the disk drive of FIG. 2 during a process of changing back from the security enable mode to the normal mode, according to an embodiment of the present invention.

FIG. 4 illustrates another embodiment of the present invention for changing from the security enable mode back to the normal mode in the hard disk drive. Referring to FIG. 4, the controller 240 determines whether the hard disk drive is powered on (s401 of FIG. 4). If the hard disk drive is powered on, the controller 240 starts the initialization process of the hard disk drive in the security enable mode (s402 of FIG. 4). In such an initialization process, the spindle motor 14 is rotated at a predetermined speed, and the transducer 16 is moved to the second area of the disk 12 which stores the MC data. In one embodiment of the present invention, location information of the second area of the disk 12 was stored in the memory 250 so that such location information is read from the memory 250.

Next, the MC data is read from the second area of the disk 12 by the transducer 16, and the MC data is stored in the buffer 260 (s403 of FIG. 4). After the initialization process, the hard disk drive is placed in the standby mode until a next command is input (s404 of FIG. 4).

Subsequently, the controller 240 checks whether a security disable command is input to the controller 240 from the host computer via the host interface 230 (s405 of FIG. 4). If the security disable command is input to the controller 240, the MC data stored in the second area of the disk 12 is moved to and stored in the first area of the disk 12 (s406 of FIG. 4). In addition, the MC data stored in the second area is erased (s406 of FIG. 4). In one embodiment of the present invention, location information of the initially set first area of the disk 12 was stored in the memory 250 so that such location information is read from the memory 250. Thereafter, the security flag is set to "0" for representing the normal mode (s407 of FIG. 4).

In this manner in FIG. 4, when the host computer indicates a change from the security enable mode to the security disable mode (i.e., normal mode), the controller 240 moves the MC data back to the first area from the second area within the disk 12. The location of the second area was randomly generated and stored into the memory 250 during the security enable mode in FIG. 3. The location of the first area is for the initially set first area in FIG. 3 and was stored in the memory 250. Thereafter, the controller 240 sets the security flag to "0" for representing the normal mode (s407 of FIG. 4).

Figure 5:
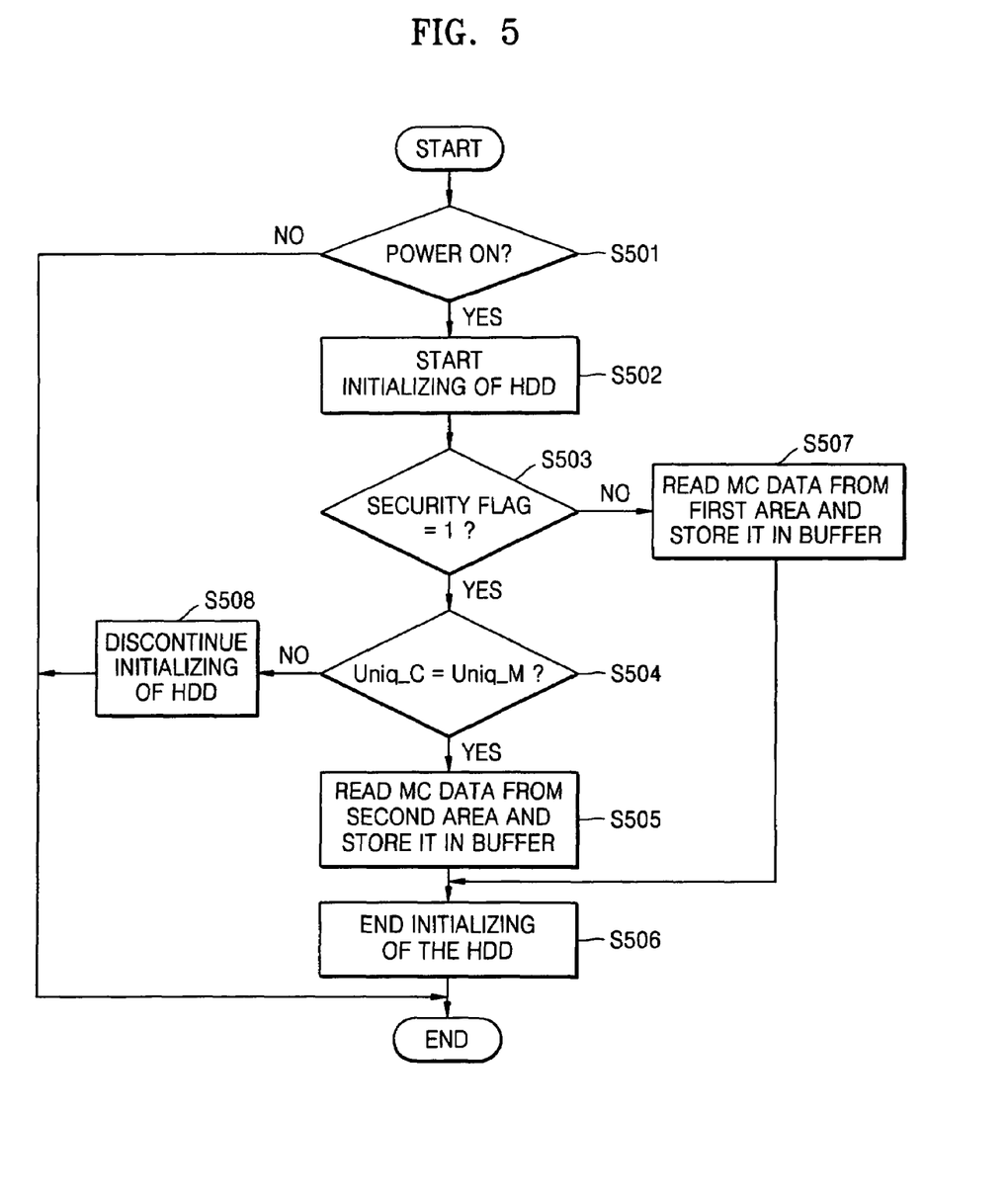
FIG. 5 is a flowchart of steps performed by the controller of the disk drive of FIG. 2 during an initialization process for data protection, according to an embodiment of the present invention.

FIG. 5 illustrates an initialization process with data protection in the hard disk drive after the security flag has been set to one of "1" or "0" for representing the security enable mode or the normal mode, as illustrated in FIG. 3 or 4. Referring to FIG. 5, the controller 240 determines whether the hard disk drive is powered on (s501 of FIG. 5). If the hard disk drive is powered on, the controller 240 starts the initialization process of the hard disk drive (s502 of FIG. 5).

Thereafter, the controller 240 checks whether the security flag is set to "1" for representing the security enable mode (s503 of FIG. 5). If the security flag is set to "1", the controller 240 determines whether the first cipher, Uniq_C, in the firmware installed in the memory 250 is equivalent to the second cipher, Uniq_M, stored in the disk 12 (s504 of FIG. 5). In an example embodiment of the present invention, the first cipher, Uniq_C, is equivalent to the second cipher, Uniq_M, when such first and second ciphers are the same.

If the first and second ciphers, Uniq_C and Uniq_M, are the same, the MC data is read from the second area of the disk 12 and stored in the buffer 250 (s505 of FIG. 6), and the initialization process is completed (s506 of FIG. 5). In one embodiment of the present invention, the location information of the second area of the disk 12 was stored in the memory 250 in step s307 of FIG. 3 so that such location information is read from the memory 250. On the other hand, if the first and second ciphers, Uniq_C and Uniq_M, are not the same, the initialization process is discontinued (s508 of FIG. 5), and the initialization process is terminated.

Referring back to step S503 of FIG. 5, if the security flag is determined to not be set to "1", the initialization process is performed in the normal mode. In that case, the MC data is read from the first area and stored in the buffer 250 (s507 of FIG. 5), and the initialization process is completed (s506 of FIG. 5). In one embodiment of the present invention, the location information of the first area of the disk 12 was stored in the memory 250 so that such location information is read from the memory 250.

Figure 6:
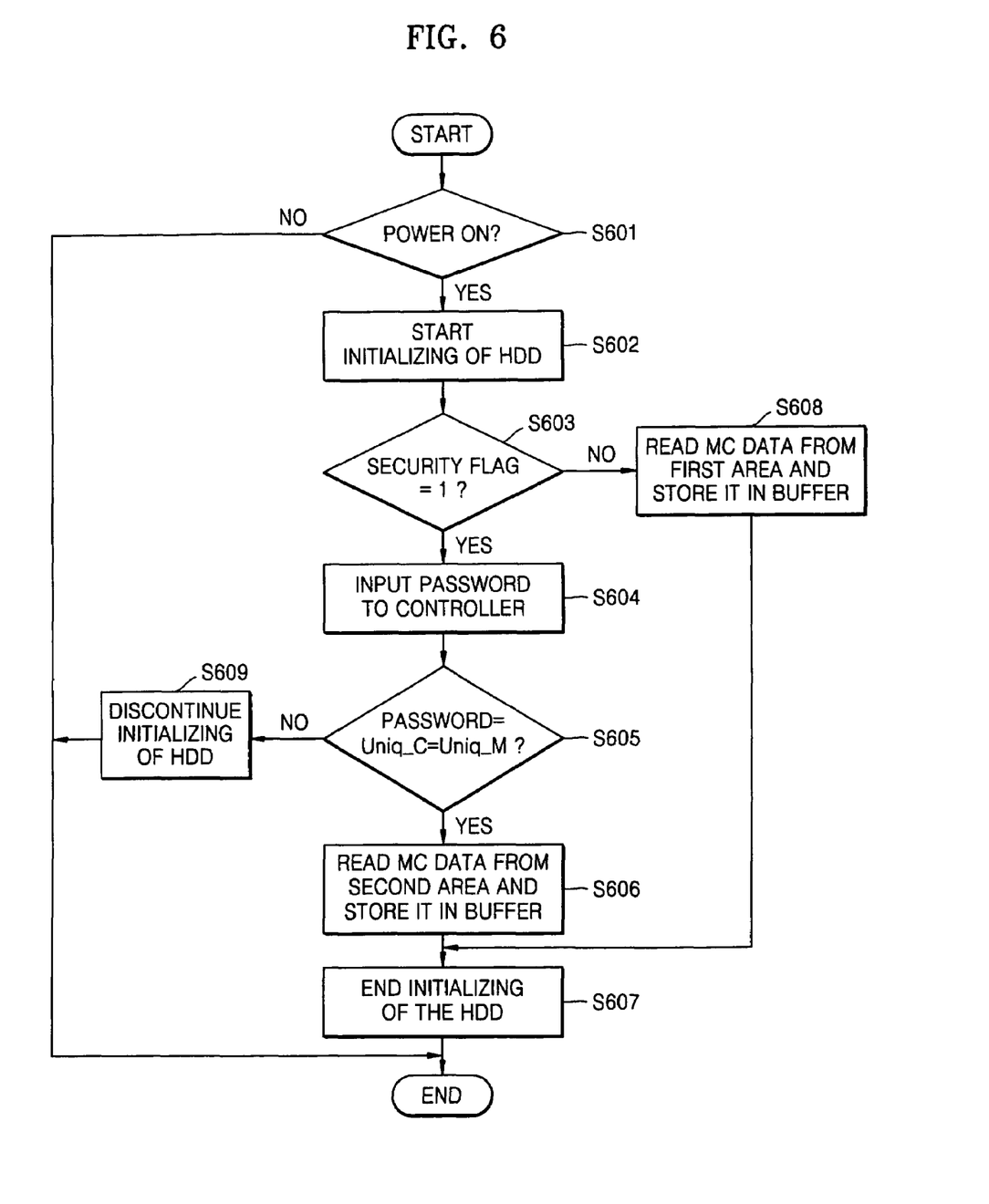
FIG. 6 is a flowchart of steps performed by the controller of the disk drive of FIG. 2 during an initialization process with input of a password for data protection, according to another embodiment of the present invention.

FIG. 6 illustrates an initialization process with data protection in the hard disk drive after the security flag has been set to one of "1" or "0", as illustrated in FIG. 3 or 4, with input of a user password according to another embodiment of the present invention. Referring to FIG. 6, the controller 240 determines whether the hard disk drive is powered on (s601 of FIG. 6). If the hard disk drive is powered on, the controller 240 starts the initialization process of the hard disk drive (s602 of FIG. 6).

Next, the controller 240 checks whether a security flag is set to "1" for representing the security enable mode (s603 of FIG. 6). If the security flag is set to "1", the controller 240 receives a user password from the host computer via the host interface 230 (s604 of FIG. 6).

Thereafter, the controller 240 determines whether the user password received form the host computer, the first cipher, Uniq_C, in the firmware code 701 within the memory 250, and the second cipher, Uniq_M, stored in the disk 12 are substantially the same (s605 of FIG. 6). If the user password and the first and second ciphers, Uniq_C and Uniq_M, are the same, the MC data is read from the second area of the disk 12 and stored in the buffer 260 (s606 of FIG. 6), and the initialization process is completed (s607 of FIG. 6). In one embodiment of the present invention, the location information of the second area of the disk 12 was stored in the memory 250 in step s307 of FIG. 3 so that such location information is read from the memory 250.

On the other hand, if the user password and the first and second ciphers, Uniq_C and Uniq_M, are not the same, the initialization process is discontinued and terminated (s609 of FIG. 6). Alternatively, referring back to step s603 of FIG. 6, if the security flag is not set to "1", the hard disk drive is to operate in the normal mode. In that case, the MC data is read from the first area of the disk 12 and stored in the buffer 250 (s608 of FIG. 6), and the initialization process is completed (s607 of FIG. 6). In one embodiment of the present invention, the location information of the first area of the disk 12 is stored in the memory 250 so that such location information is read from the memory 250.

In this manner, the hard disk drive of the present invention changes the first and second ciphers, in the firmware code and in the disk 12, respectively, to a randomly generated value in the security enable mode. In addition, the MC data is moved and stored in a random location of the disk 12. Furthermore, the controller 240 determines whether an electrical circuit board of the hard disk drive having the firmware 701 loaded therein matches the disk 12 of the hard disk assembly, before providing access to the critical MC data in the security enable mode. Therefore, an unauthorized user does not have access to critical initialization data, such as the MC data, stored in the hard disk drive by changing parts of or entire electrical components of the disk drive including the firmware.

In addition, the hard disk drive erases critical data stored in the second area of the disk 12 when the security enable mode is disabled. Furthermore, the hard disk drive requires password verification in the security enable mode for access to such critical data. Thus, the critical data is not accessible except when an authorized user operates the hard disk drive in the security enable mode.

The present invention can be realized as a method, an apparatus, a system, and so on. When the present invention is realized as software, the members of the present invention are code segments which execute necessary operations. Programs or code segments may be stored in a processor readable medium or may be transmitted by a transmission medium or by a computer data signal combined with a carrier in a communication network. The processor readable medium may be any medium, such as an electronic circuit, a semiconductor memory device, a ROM, a flash memory, an erasable ROM, a floppy disc, an optical disc, a hard disc, an optical fiber medium, or a radio frequency (RF) network, which can store or transmit information. The computer data signal may be any signal which can be transmitted through a transmission medium such as an electronic network channel, an optical fiber, air, an electromagnetic field, or an RF network.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of protecting data within a data storage system, comprising:
    determining whether a security enable command is input to a controller from a host;
    moving initialization data from a first area of a disk to a second area of the disk when the security enable command is input, wherein a location of the second area of the disk is randomly generated; and
    erasing the initialization data from the first area of the disk when the security enable command is input.

2. The method of claim 1, further comprising:
    storing information of the location of the second area of the disk in a memory.

3. The method of claim 2, wherein the memory is a non-volatile memory.

4. The method of claim 1, further comprising:
    changing a first cipher for firmware and a second cipher stored in a predetermined area of the disk into a randomly generated value when the security enable command is input; and
    setting a security flag to represent a security enable mode when the security enable command is input.

5. The method of claim 4, further comprising:
    determining whether the security flag is set to represent the security enable mode during initialization of the data storage system;
    reading the initialization data from the first area of the disk when the security flag is not set to represent the security enable mode;
    comparing the first cipher with the second cipher when the security flag is set to represent the security enable mode; and
    reading the initialization data from the second area of the disk if the first cipher is substantially same as the second cipher.

6. The method of claim 4, further comprising:
    determining whether the security flag is set to represent the security enable mode during initialization of the data storage system;
    reading the initialization data from the first area of the disk when the security flag is not set to represent the security enable mode;
    receiving a user password when the security flag is set to represent the security enable mode;
    comparing the user password, the first cipher, and the second cipher, when the security flag is set to represent the security enable mode; and
    reading the initialization data from the second area of the disk when the user password, the first cipher, and the second cipher are substantially same.

7. The method of claim 1, wherein when a security disable command is input during the security enable mode, the method further comprises:
    moving the initialization data from the second area back to the first area;
    erasing the initialization data from the second area; and
    setting a security flag to represent a normal mode.

8. The method of claim 1, wherein the data storage system is a hard disk drive.

9. The method of claim 8, wherein the initialization data comprises maintenance cylinder data.

10. A method of controlling a data storage system, comprising:
    determining whether a security flag is set to represent a security enable mode during initialization of the data storage system;
    reading initialization data from a first area of a disk when the security flag is not set to represent the security enable mode;
    comparing a first cipher for firmware with a second cipher stored in a predetermined area of the disk when the security flag is set to represent the security enable mode; and
    reading the initialization data from a second area of the disk if the first cipher is substantially same as the second cipher.

11. The method of claim 10, wherein a location of the second area of the disk is stored in a memory.

12. The method of claim 10, wherein the initialization data is stored in a buffer after being read from the disk.

13. The method of claim 10, wherein the data storage system is a hard disk dive.

14. The method of claim 13, wherein the initialization data comprises maintenance cylinder data.

15. A method of controlling a data storage system, comprising:
- determining whether a security flag is set to represent a security enable mode during initialization of the data storage system;
- reading initialization data from a first area of a disk when the security flag is not set to represent the security enable mode;
- receiving a user password when the security flag is set to represent the security enable mode;
- comparing the user password, a first cipher for firmware, and a second cipher stored in a predetermined area of the disk; and
- reading the initialization data from a second area of the disk when the user password, the first cipher, and the second cipher are substantially same.

16. The method of claim 15, wherein a location of the second area of the disk is stored in a memory.

17. The method of claim 15, wherein the initialization data is stored in a buffer after being read from the disk.

18. The method of claim 15, wherein the data storage system is a hard disk dive.

19. The method of claim 18, wherein the initialization data comprises maintenance cylinder data.

20. A hard disk drive comprising:
- a controller; and
- a memory having sequences of instructions stored thereon, wherein execution of the sequences of instructions by the controller causes the controller to protect data within the hard disk drive by performing the steps of:
- determining whether a security enable command is input to the controller from a host;
- moving initialization data from a first area of a disk to a second area of the disk when the security enable command is input, wherein a location of the second area of the disk is randomly generated; and
- erasing the initialization data from the first area of the disk when the security enable command is input.

21. The hard disk drive of claim 20, further comprising:
- a host interface which receives data from and transmits data to the host;
- a buffer which stores the initialization data read from the disk; and
- a write/read circuit that writes data input from the host interface to the disk and that processes data read from the disk.

22. The hard disk drive of claim 20, wherein execution of the sequences of instructions by the controller causes the controller to further perform the step of:
- storing information of the location of the second area of the disk in the memory.

23. The hard disk drive of claim 20, wherein the memory is a non-volatile memory.

24. The hard disk drive of claim 20, wherein execution of the sequences of instructions by the controller causes the controller to further perform the steps of:
- changing a first cipher for firmware stored within the memory and a second cipher stored in a predetermined area of the disk into a randomly generated value when the security enable command is input; and
- setting a security flag to represent a security enable mode when the security enable command is input.

25. The hard disk drive of claim 24, wherein execution of the sequences of instructions by the controller causes the controller to further perform the steps of:
- determining whether the security flag is set to represent the security enable mode during initialization of the hard disk drive;
- reading the initialization data from the first area of the disk when the security flag is not set to represent the security enable mode;
- comparing the first cipher with the second cipher when the security flag is set to represent the security enable mode; and
- reading the initialization data from the second area of the disk if the first cipher is substantially same as the second cipher.

26. The hard disk drive of claim 24, wherein execution of the sequences of instructions by the controller causes the controller to further perform the steps of:
- determining whether the security flag is set to represent the security enable mode during initialization of the hard disk drive;
- reading the initialization data from the first area of the disk when the security flag is not set to represent the security enable mode;
- receiving a user password when the security flag is set to represent the security enable mode;
- comparing the user password, the first cipher, and the second cipher, when the security flag is set to represent the security enable mode; and
- reading the initialization data from the second area of the disk when the user password, the first cipher, and the second cipher are substantially same.

27. The hard disk drive of claim 20, wherein when a security disable command is input during the security enable mode, execution of the sequences of instructions by the controller causes the controller to further perform the steps of:
- moving the initialization data from the second area back to the first area;
- erasing the initialization data from the second area; and
- setting a security flag to represent a normal mode.

28. The hard disk drive of claim 20, wherein the initialization data comprises maintenance cylinder data.

* * * * *